(12) United States Patent
Baker et al.

(10) Patent No.: US 7,353,040 B2
(45) Date of Patent: Apr. 1, 2008

(54) CLOSED-LOOP POWER CONTROLLED RADIO COMMUNICATION SYSTEM

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 130 days.

(21) Appl. No.: 10/556,006

(22) PCT Filed: May 6, 2004

(86) PCT No.: PCT/IB2004/001534

§ 371 (c)(1),
(2), (4) Date: Nov. 8, 2005

(87) PCT Pub. No.: WO2004/102827

PCT Pub. Date: Nov. 25, 2004

(65) Prior Publication Data

US 2006/0223445 A1    Oct. 5, 2006

(30) Foreign Application Priority Data

May 13, 2003  (GB) ................................. 0310948.5
Aug. 19, 2003 (GB) ................................. 0319454.5

(51) Int. Cl.
*H04B 7/00* (2006.01)

(52) U.S. Cl. ..................... 455/522; 455/69; 455/115.1; 455/126; 455/127.1; 455/127.2

(58) Field of Classification Search ................ 455/522, 455/69, 115.1, 126, 127.1, 127.2
See application file for complete search history.

(56) References Cited

U.S. PATENT DOCUMENTS

| 6,374,085 | B1* | 4/2002 | Saints et al. ................... 455/69 |
| 6,983,166 | B2* | 1/2006 | Shiu et al. .................... 455/522 |
| 2002/0173309 | A1* | 11/2002 | Shahidi et al. .............. 455/442 |
| 2003/0153345 | A1* | 8/2003 | Cramer, III ................. 455/522 |
| 2005/0208961 | A1* | 9/2005 | Willenegger ................ 455/522 |

FOREIGN PATENT DOCUMENTS

| WO | 9965158 A1 | 12/1999 |
| WO | 0143296 A1 | 6/2001 |

* cited by examiner

*Primary Examiner*—Philip J. Sobutka
*Assistant Examiner*—Dominic E. Rego (57) ABSTRACT

In a radio communication system (50) employing closed loop power control a primary station (100) adjusts its transmit power in response to control information including power control commands received from a secondary station (100). If the primary station (100) fails to obey the power control commands the secondary station modifies the control information and the primary station (100) uses the modified control information to adapt a characteristic of a transmission.

24 Claims, 4 Drawing Sheets

CLOSED-LOOP POWER CONTROLLED RADIO COMMUNICATION SYSTEM

The present invention relates to a radio communication system, to a primary station and to a secondary station for use in a communication system, and to a method of operating a communication system.

In a radio communication system comprising base stations of fixed location and mobile stations, such as UMTS (Universal Mobile Telecommunication System), transmissions from a base station to a mobile station take place on a downlink channel and transmissions from a mobile station to a base station take place on an uplink channel. It is known for such systems to use closed loop transmit power control in which a mobile station measures the quality of a received downlink signal and transmits transmit power control (TPC) commands to the base station so that an adequate, but not excessive, received signal level is maintained at the mobile station despite fluctuations in downlink channel attenuation. The TPC commands typically comprise "increase power" and "decrease power" commands where the step size of the increase or decrease is predetermined.

Also, it is known to vary the step size of the TPC commands in response to fluctuations in the prevailing channel attenuation. For example using a large step when the channel attenuation is changing quickly, and using a small step when the channel attenuation is changing slowly. In this way the transmit power can better track changes in channel conditions.

Furthermore, it is known for radio communication systems to use transmission format control in which a mobile station measures the quality of a received downlink signal and transmits reports of the quality (typically referred to as Channel Quality Information reports or Channel Quality Indicator (CQI) reports) to a base station, and the base station then schedules packet transmissions to certain mobile stations and selects a transmission format, for example modulation and coding scheme, suitable for optimising communication under the prevailing channel conditions. Such channel quality reports may provide an indication of, for example, carrier-to-interference ratio, signal-to-noise ratio, delay spread, or a recommended transmission format suited to the prevailing channel conditions. As an example, the High-Speed Downlink Packet Access (HSDPA) feature of UMTS uses adaptive modulation and coding (AMC) to set suitable transmission parameters for transmitted downlink (DL) data. The modulation and coding scheme for the DL data may be selected by the base station on the basis of the current transmit power used for a power-controlled channel, calibrated by intermittent channel quality reports received from the mobile station. An uplink may be operated in an equivalent manner.

Typically, the quality measurements used for generating the channel quality reports are made on a downlink signal whose transmit power is not varied by a closed loop power control process, such as the Common Pilot Channel (CPICH) in UMTS, but the quality measurements used for generating the TPC commands have to be made on a downlink signal whose transmit power is varied as a result of the TPC commands, in order to achieve closed loop operation.

The channel quality reports are generally transmitted at a lower rate than the TPC commands and so the TPC commands may additionally be used by the base station to assist scheduling of transmissions and selection of a transmission format.

There can be circumstances under which a transmitting station is unable to obey power control commands, for example:
- an "increase power" command may be received when the transmitting station is already transmitting at its maximum power level, or at its maximum power level for the particular channel;
- a "decrease power" command may be received when the transmitting station is already transmitting at its minimum non-zero power level, or at its minimum non-zero power level for the particular channel;
- a processing overload may occur, preventing the transmitting station from processing the power control commands.

If a transmitting station does not obey the power control commands, the simple "increase power" or "decrease power" commands of the closed-loop power control, are no longer representative of the actual level of the channel attenuation. In this circumstance, the transmitting station merely knows that the current channel attenuation is better or worse than the current transmit power level would suggest. This prevents the transmitter from using the transmit power level as a reliable indicator when choosing suitable parameter values for transmitted signals. As a result, transmission parameters may be non-optimal until the transmitting station is able to resume obeying the power control commands and the power control loop has re-converged. This period of non-optimal operation can result in inefficiency.

An object of the present invention is to contribute to improved efficiency.

According to a first aspect of the present invention there is provided a secondary station for use in a communication system comprising a primary station and a secondary station, the secondary station comprising: receiver means for receiving a first signal transmitted by the primary station; measurement means for measuring a first characteristic of the received first signal; processing means for deriving power control commands from the measured first characteristic; transmitter means for transmitting control information comprising at least the power control commands to the primary station; and further comprising control means responsive to the primary station failing to adjust its transmit power in compliance with the transmitted power control commands for modifying a parameter of the control information transmitted to the primary station.

According to a second aspect of the present invention there is provided a communication system comprising a secondary station in accordance with the first aspect of the invention and a primary station, the primary station comprising: transmitter means for transmitting a first signal; receiver means for receiving power control commands; control means for adjusting the transmit power of the first signal in compliance with the received power control commands provided that the adjustment is within the contemporaneous capability of the primary station; and wherein the primary station control means is adapted to adapt a characteristic of a transmission in response to receiving the modified control information transmitted by the secondary station.

According to a third aspect of the present invention there is provided a primary station for use in a communication system comprising a primary station and a secondary station, the primary station comprising: transmitter means for transmitting a first signal; receiver means for receiving power control commands; control means for adjusting the transmit power of the first signal in compliance with the received power control commands provided that the adjustment is within the contemporaneous capability of the primary station; and wherein the control means is adapted to generate an indication for transmission in response to failing to adjust the transmit power of the first signal in compliance with the received power control commands.

According to a fourth aspect of the present invention there is provided a method of operating a communication system comprising a primary station and a secondary station, the method comprising:

transmitting a first signal from the primary station;

at the secondary station,
  receiving the first signal;
  while receiving the first signal, measuring a first characteristic of the received first signal, deriving power control commands from the measured first characteristic, and transmitting control information comprising at least the power control commands;

at the primary station,
  receiving the power control commands;
  adjusting the transmit power of the first signal in compliance with the received power control commands provided that the adjustment is within the contemporaneous capability of the primary station;

further comprising, at the secondary station, in response to the primary station failing to adjust the transmit power in compliance with the received power control commands, modifying a parameter of the control information transmitted to the primary station, and at the primary station, in response to receiving the modified control information, adapting a characteristic of a transmission.

The invention is based on the realisation that a primary station may not always be able to obey power control commands, that this circumstance may be detectable or predictable, and that action may be taken while the primary station is not obeying power control commands to assist recovery when the primary station is able to resume obeying power control commands, thereby reducing inefficiency. In response to the primary station not obeying power control commands, or at times when the primary station may not be able to obey power control commands, the secondary station modifies a parameter of the control information that it transmits to the primary station, and in response to receiving the modified control information, the primary station adapts a characteristic of its transmission.

Embodiments of the invention will now be described, by way of example, with reference to the accompanying drawings wherein.

Figure 1:
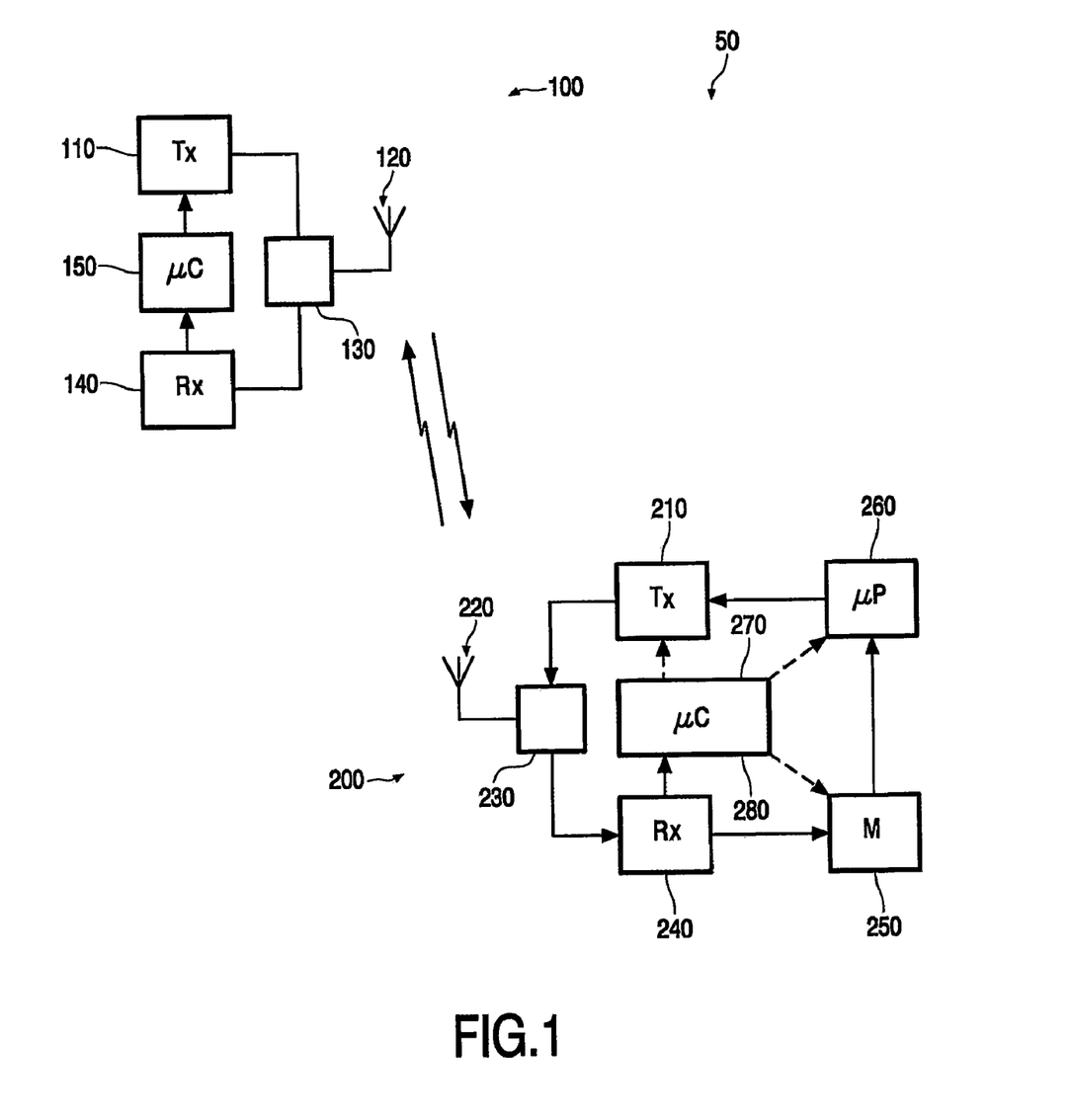
FIG. 1 is a block schematic diagram of a communication system comprising a primary station and a secondary station.

Referring to FIG. 1, there is illustrated a radio communication system 50 comprising a primary station 100 and a secondary station 200.

The primary station 100 comprises a transmitter means 110 for transmitting a first signal, for example a data signal, to the secondary station 200. The transmitter means 110 has an output coupled to an antenna means 120 via coupling means 130 which may be, for example, a circulator or changeover switch. The coupling means 130 also couples signals received by the antenna means 120 to an input of a receiver means 140. Coupled to the transmitter means 110 and the receiver means 140 is a control means (μC) 150 for adjusting the transmit power of the first signal in response to TPC commands received from the secondary station 200, provided that the adjustment is within the contemporaneous capability of the primary station. The contemporaneous capability of the primary station may depend on the amount of power being used for transmitting other signals, on any maximum and minimum power limits which may apply, or on the current processing load.

Optionally the control means 150 may generate an indication for transmission in response to the transmit power failing to be adjusted in compliance with the received power control commands.

Optionally the control means 150 may generate a second signal, such as a pilot signal, for transmission to the secondary station, the transmit power of this second signal not being controlled by a power control loop.

Optionally the control means 150 may select a transmission format, for example bit rate, modulation scheme, or coding scheme, for the first signal or any other signal in response to channel quality reports received from the secondary station 200.

The secondary station 200 comprises a transmitter means 210 having an output coupled to an antenna means 220 via coupling means 230 which may be, for example, a circulator or changeover switch. The coupling means 230 also couples signals received by the antenna means 220 to an input of a receiver means 240. Coupled to an output of the receiver means 240 is a measurement means (M) 250 for measuring a first characteristic, for example received signal power, signal-to-interference ratio (SIR) or signal-to-noise ratio (SNR) or rate of change of these ratios, of the first signal received from the primary station. Coupled to an output of the measurement means 250 is a processing means (μP) 260, for deriving power control commands from the measured first characteristic of the first signal. An output of the processing means 260 is coupled to an input of the transmitter means 210 for transmitting control information including at least the power control commands to the primary station.

Coupled to an output of the receiver means 240 is a control means (μC) 270. In one embodiment, the control means 270, by monitoring the received signal, is adapted to determine that the primary station has failed to adjust its transmit power in compliance with the power control commands. In another embodiment the control means 270 is adapted to receive from the primary station 100 an indication that the primary station 100 has failed to adjust its transmit power in compliance with the power control commands. In another embodiment the control means 270 stores an indication of one or more predetermined times at which the primary station 100 may fail to adjust its transmit power in compliance with the power control commands.

In response to the primary station 100 failing, or potentially failing at one of the stored predetermined times, to adjust its transmit power in compliance with the power control commands, the control means 270 is adapted to modify a parameter of the control information transmitted to the primary station 100. The control means 270 may perform this function in several alternative ways as described below, or in a combination of the ways. In FIG. 1, optional couplings dependent on the operation of the control means 270 are drawn using broken lines.

In one embodiment the control means 270 is adapted to modify a parameter of the control information transmitted to the primary station 100 by generating an indication of a power step size for transmission to the primary station 100 to use when adjusting its transmit power; for this purpose the control means 270 may be coupled to the transmitter means 210. The indication of power step size may represent a specific amount or number of increments by which the primary station 100 should adjust its transmit power, or may indicate the discrepancy between the currently-received SIR at the secondary station 200 and a target SIR level. For example, the power control commands may be changed from simply "increase power" to "increase power by xdB" or "increase power by x increments", where x is varied depending on the difference between the quality of the received first signal and a target quality, or the power control commands may be changed to "increase power; discrepancy xdB" where x is the discrepancy between the currently-received SIR at the secondary station 200 and a target SIR level. At the primary station 100, the control means 150 may use the additional information "x" to adapt a characteristic of a transmission to improve efficiency. For example, the control means 150 may use the additional information to predict a suitable transmit power level to use when it is able to resume obeying transmit power control commands.

As another example of the way in which a parameter of the control information transmitted to the primary station 100 may be modified, the secondary station 200 may group together a plurality of power control commands to enable each command to be transmitted indicating a power step size at a higher resolution using more bits, but at a lower rate.

In another embodiment, which may be used in conjunction with a primary station 200 that transmits the second signal, the measurement means 250 is adapted to measure a characteristic, such as SIR or SNR, of the second signal, and the processing means 260 is adapted to derive channel quality reports from the measured characteristic for transmission by the transmitter means 210 at a predetermined rate. In this embodiment, the control means 270 is adapted to modify a parameter of the control information transmitted to the primary station 100 by causing the channel quality reports to be transmitted at a rate higher than the predetermined rate; for this purpose the control means 270 may be coupled to the processing means 260. At the primary station 100, the control means 150 may use the additional information provided by the additional channel quality reports to adapt a characteristic of a transmission to improve efficiency. For example, the control means 150 may use the additional channel quality reports to predict a suitable transmit power level to use when it is able to resume obeying transmit power control commands, or to select a suitable modulation or coding scheme for the first signal or another signal.

In another embodiment, which may be used in conjunction with a primary station 200 that transmits the second signal, the measurement means 250 is adapted to measure a characteristic, such as SIR or SNR, of the second signal by averaging a function, such as a logarithmic function or simply unity, of the characteristic over a predetermined time period, and the processing means 260 is adapted to derive channel quality reports from the measured characteristic for transmission by the transmitter means 210. The channel quality reports may comprise a recommend modulation and coding scheme. In this embodiment, the control means 270 is adapted to modify a parameter of the control information transmitted to the primary station 100 by causing the averaging to be performed over a time period shorter than the predetermined time period; for this purpose the control means 270 may be coupled to the measurement means 250. By reducing the averaging period, more detail about channel variations is provided to the primary station 100. At the primary station 100, the control means 150 may use the additional detail to adapt a characteristic of a transmission to improve efficiency. For example, the control means 150 may use the additional detail to predict a suitable transmit power level to use when it is able to resume obeying transmit power control commands, or to select a suitable modulation or coding scheme for the first signal or another signal.

Figure 2:
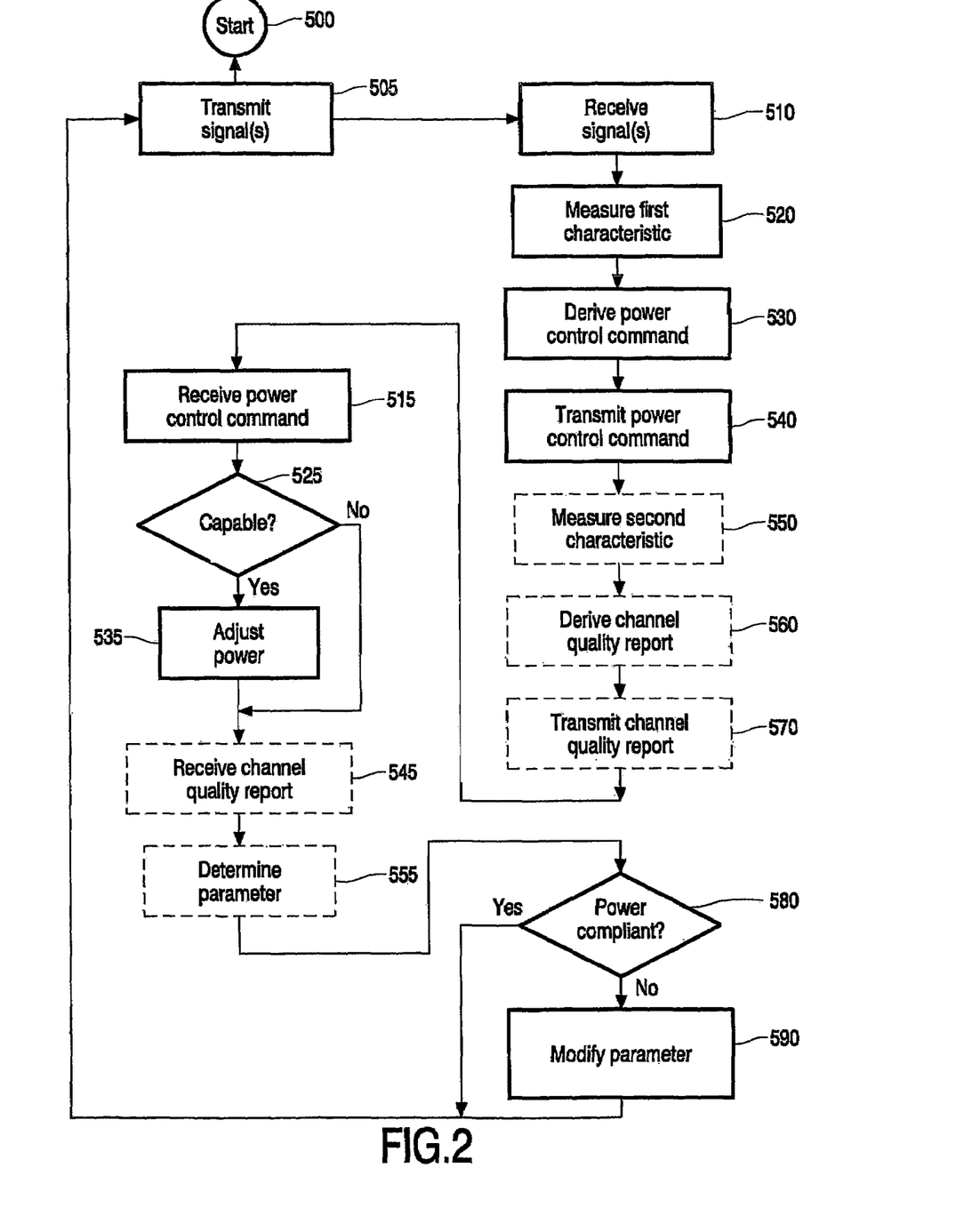
FIG. 2 is a flow chart illustrating a method of operating a communication system in accordance with the invention.

FIG. 2 is a flow chart illustrating a method of operating a communication system in accordance with the invention. The method starts at step 500. Steps on the left hand side of FIG. 2 and labelled with reference numerals ending in "5" relate to steps performed at the primary station 100, and steps on the right hand side of the Figure and labelled with reference numerals ending in "0" relate to steps performed at the secondary station 200. Steps which are optional are drawn with boxes having broken lines.

At step 505 the primary station 100 commences transmitting a first signal, for example a data signal, to a secondary station 200. This first signal will be subject to closed loop power control. The primary station 100 may optionally also commence transmission of a second signal, such as a pilot control signal, which will not be subject to closed loop power control but is transmitted at a constant power level, or at a power level which varies in a predetermined manner known to the secondary station 200.

At step 510 the secondary station 200 commences receiving the first signal, and the second signal if transmitted. At step 520 the secondary station 200 measures a first characteristic of the first signal, such as received signal power, SIR or SNR, or difference between these quantities and a target, or rate of change of these ratios. At step 530 the secondary station 200 derives a power control command from the measured a first characteristic of the first signal. At step 540 the secondary station 200 transmits the power control command.

At optional step 550, if the second signal has been received, the secondary station 200 measures a second characteristic of the second signal. The second characteristic may be, for example, received signal power, SIR or SNR.

At optional step 560, if the second signal has been received, a channel quality report is derived from the measured second characteristic of the second signal, for example by averaging, and at step 570 the secondary station 200 transmits the channel quality report.

Flow then proceeds to step 515 where the primary station 100 receives the power control command.

At step 525 the primary station determines whether it is currently capable of obeying the power control command. If it is, at block 535 it adjusts the transmit power of the first signal in accordance with the command. In either event, flow proceeds to optional step 545 where, if a channel quality report has been transmitted, the channel quality report is received and, at block 555 the primary station 100 determines, based on the channel quality report, a parameter for the first signal or another signal. Such a parameter may be, for example, a data rate, modulation scheme or coding scheme.

Flow then proceeds to step 580 where the secondary station 200 determines whether the primary station 100 has obeyed, or may not obey, the power control command. This condition need not be determined command by command, but may be determined by taking an average over more than one power control command so that, for example, failure to obey only one of a sequence of power control commands is ignored. Example methods by which the secondary station 200 may determine this condition are:

a) Determining the SIR, or other characteristic, of the received first signal and detecting when the determined characteristic fulfills a predetermined criterion. As an example, the predetermined criterion may be detecting when the SIR reduces below, (or increases above) a target level for a predetermined period of time, or for a predetermined proportion of a longer period of time. As another example, the predetermined criterion may be detecting when the rate of change of SIR over a predetermined time period, or for a predetermined proportion of a longer period of time, is equal to, or within a predetermined tolerance of, the rate of change of SIR of a non-power controlled signal such as the second signal.

b) Receiving an indication transmitted by the primary station 200 of failure to obey the power control command.

c) Referring to predetermined times stored by the secondary station 200 at which the power control commands may not be obeyed.

If the secondary station 200 autonomously determines that power control commands are not being obeyed, or may not be obeyed, it may signal this condition to the primary station 100 to enable the primary station 100 to assist the primary station 100 to detect the modified control information transmitted by the secondary station 200.

If the power control command is not obeyed, or may not be obeyed, the secondary station 200 at step 590 modifies a parameter of the control information transmitted to the primary station 100. Examples of this modification are:

a) Additional information such as a power step size may be included in the control information, as described above.

b) The rate at which channel quality reports are transmitted may be increased, as described above.

c) The way that channel quality reports are derived from the measured second characteristic of the second signal may be modified. For example, the channel quality reports may be derived by averaging a function, such as a logarithmic function or simply unity, of the measured second characteristic over a predetermined time period, and in response to the power control command not being obeyed, the averaging period may be decreased. By decreasing the averaging period, more detailed information can be included in the channel quality reports because less information is discarded through averaging. As an example, when the invention is applied to UMTS, the secondary station 200 may normally report channel quality averaged over 40 sub-frames, where 40 sub-frames has a duration of 80 ms, but change to reporting channel quality averaged over 1 sub-frame (2 ms) if the primary station 100 is often transmitting at maximum power.

Whether or not a parameter of the control information transmitted to the primary station 100 is modified in response to the primary station not obeying the power control command, flow returns to step 505 and continues in a loop until the signal transmission finishes. At the second or subsequent passes through step 505, the primary station 100 may apply the modified control information received from the secondary station 100 in adapting a characteristic of the transmitted first signal, or of another signal transmitted simultaneously or non-simultaneously with the first signal. Examples of how the primary station 100 may apply the modified control information received from the secondary station 200 are:

a) A transmit power level for the first signal may be determined for when the primary station 100 is able to resume obeying power control commands.

b) If the transmit power of the primary station 100 is deployed across a plurality of simultaneously transmitted signals, when transmission of one of the signals terminates, thereby making more power available for the remaining signals, the primary station 100 may determine how to deploy the newly available power to the remaining signals.

c) If the transmit power level of the first signal is inadequate for reliable communication, the primary station 100 may decide to re-deploy that power to another signal which can achieve reliable communication with the additional power.

In each of these examples, the modification of a parameter of the control information transmitted to the primary station enables the primary station 100 to adapt its transmissions more rapidly, thereby improving efficiency.

The time period for which the secondary station 200 transmits the modified control information, or the time period for which the primary station 100 continues to adapt a characteristic of the transmitted signal in response to receiving the modified control information, may be predetermined, or may be dependent on the time period for which the primary station fails to obey power control commands.

Figure 3:
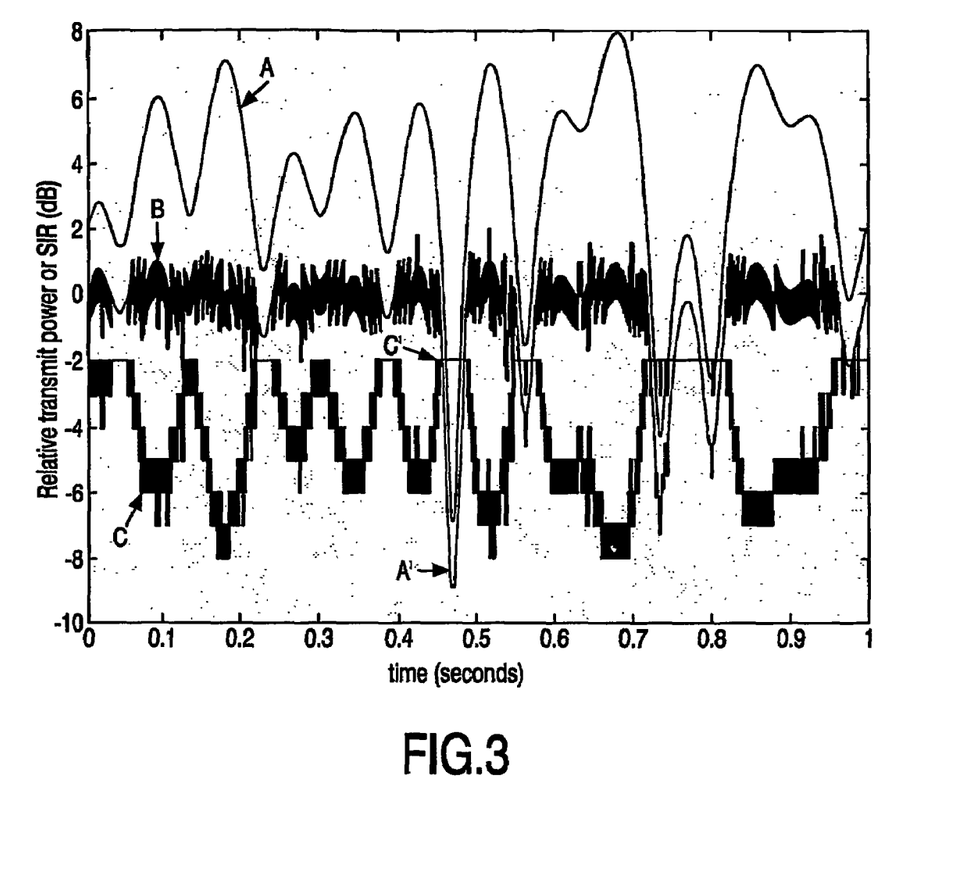
FIG. 3 is a graph illustrating the variation of signal-to-interference ratio and transmit power with time.

Referring to FIG. 3, graph A illustrates the variation with time of the SIR of the second signal, which is not power controlled; large variations in SIR may be observed. Graph B illustrates the variation with time of the SIR of the first signal, which is power controlled; due to the power control, the extent of variation is decreased to approximately ±1 dB for most of the time. Graph C illustrates the relative transmit power of the power controlled first signal; it can be seen that the upper limit to the transmit power is −2 dB and that the lower non-zero limit is −8 dB, and that power control commands to increase the power above −2 dB during a dip in the SIR cannot be obeyed. In the region indicated at A' the SIR of the second signal has dipped, the transmit power of the first signal has peaked as indicated at C', and so the power control commands cannot be obeyed, and so the SIR of the first signal has dipped outside of the controlled range ±1 dB.

Figure 4:
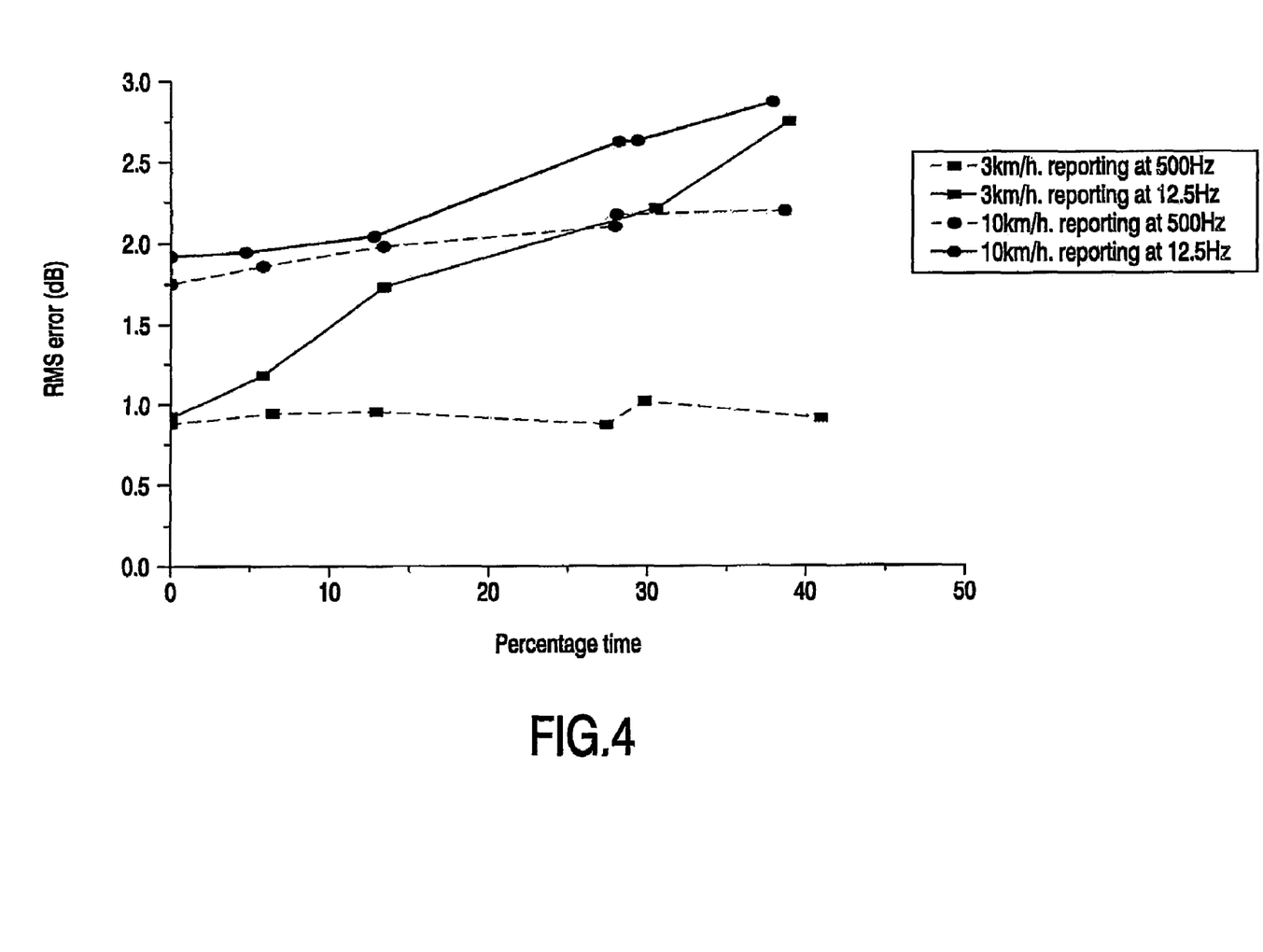
FIG. 4 is a graph illustrating a benefit of the invention.

Referring to FIG. 4, there is illustrated the benefit of increasing the rate at which channel quality reports are transmitted when the primary station 100 fails to obey transmit power control commands. The abscissa is the percentage of time for which the first signal is transmitted at maximum power. The primary station 100 estimates the SIR of the first signal from the current transmit power of the first signal: If the power control commands were being obeyed, the SIR of the first signal would be expected to be proportional to the reciprocal of the transmitted power. The primary station 100 then uses channel quality reports received at regular intervals from the secondary station 200 to calibrate the estimated SIR in order to select suitable modulation and coding schemes for the first signal or another signal. Each modulation and coding scheme is suitable for a small range of SIR values. If the error between the estimated SIR and the actual SIR increases, the selected modulation and coding schemes become less suitable and the quality of service, for example in terms of throughput or delay, of that signal deteriorates. The error arises because, for example, a relative transmit power of −2 dB is expected (without any power constraint) to be required in conditions of a certain SIR, whereas the actual SIR is sometimes much worse leading to a demand for a higher, unattainable transmit power. The ordinate is the RMS error between the actual SIR of the first signal and the SIR for which the selected modulation and coding scheme is suitable. The RMS error should be minimised for best performance; ideally the actual SIR is equal to the SIR for which the selected modulation and coding scheme is suitable. In FIG. 4 the RMS error is plotted for two rates of transmitting channel quality reports, 12.5 Hz and 500 Hz, for each of two secondary station speeds, 3 km/h and 10 km/h. When a low reporting rate is used, the estimated SIR is not able to be calibrated very often, with the result that as the proportion of time spent at maximum power increases the selected modulation and coding schemes become less suitable for the actual SIR. Hence when a low reporting rate is used, the RMS error between the actual SIR and the SIR for which the selected modulation and coding scheme is suitable increases. If a higher reporting rate is used the estimated SIR can be calibrated more frequently by the channel quality reports so relatively suitable modulation and coding schemes may be selected even when the proportion of time spent at the maximum available transmit power level of the primary station 100 is high. Hence the RMS error is reduced by increasing the reporting rate. It can be seen that the reduction in RMS error is particularly evident at low speeds, where it is possible to use a sufficiently fast reporting rate relative to the rate of change of channel conditions to keep the estimated SIR correctly calibrated at all time. Typically, the reporting rate might be increased when the primary station 100 spends more than 15% of the time at its maximum available transmit power.

The term primary station in the present specification may denote a fixed station in a mobile communication network and the term secondary station may denote a mobile station. Equally, the term secondary station in the present specification may denote a fixed station in a mobile communication network and the term primary station may denote a mobile station.

The elements of a primary station relevant to the present invention need not be co-located, but may be distributed within a communication network. Correspondingly, the elements of a secondary station relevant to the present invention need not be co-located, but may be distributed within a communication network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of communications which may be used instead of or in addition to features already described herein.

The invention claimed is:

1. A secondary station for use in a communication system comprising a primary station and a secondary station, the secondary station comprising:
   receiver means for receiving at least a first and/or a second signal transmitted by the primary station;
   measurement means for measuring at least at least one characteristic of the received first and/or second signal;
   processing means for deriving at least one power control command and/or at least one channel quality report from a measured characteristic;
   transmitter means for transmitting control information including at least one power control command to the primary station and/or at least one channel quality report at a predetermined rate; and
   control means responsive to the primary station failing to adjust its transmit power in compliance with at least one transmitted power control command for modifying at least one parameter of the control information transmitted to the primary station, wherein the control means is adapted to modify the parameter by causing one or more channel quality reports to be transmitted at a rate different from the predetermined rate.

2. A secondary station as claimed in claim 1, wherein control means is adapted to modify at least one parameter of the control information transmitted to the primary station by generating an indication of a power step size for transmission to the primary station to use when adjusting its transmit power.

3. A secondary station as claimed in claim 1, wherein the control means is adapted to receive an indication of the failure of the primary station to adjust its transmit power in compliance with at least one transmitted power control command.

4. A secondary station as claimed in claim 1, wherein the control means is adapted to store an indication of one or more predetermined times at which the primary station may fail to adjust its transmit power in compliance with at least one transmitted power control command and wherein the control means is responsive to the occurrence of one or more predetermined times for modifying the parameter of the control information transmitted to the primary station.

5. A secondary station as claimed in claim 1, wherein the control means is adapted to detect failure of the primary station to adjust its transmit power in compliance with at least one transmitted power control command.

6. A secondary station as claimed in claim 5, wherein the control means is adapted to detect failure of the primary station to adjust its transmit power in compliance with at least one transmitted power control command by determining the signal-to-interference ratio (SIR) of a received signal and by detecting when a function of the SIR fulfills a predetermined criterion.

7. A secondary station for use in a communication system comprising a primary station and a secondary station, the secondary station comprising:
   receiver means for receiving at least one signal transmitted by the primary station;
   measurement means for measuring at least one characteristic of a received signal;
   processing means for deriving one or more power control commands and/or one or more channel quality reports from a measured characteristic, whereby at least one channel quality report is derived by averaging the function of at least one measured characteristic over a first time period;
   transmitter means for transmitting at least control information including at least one or more power control commands and/or one or more channel quality reports to the primary station;
   control means responsive to the primary station failing to adjust its transmit power in compliance with one or more transmitted power control commands for modifying a parameter of the control information transmitted to the primary station, wherein the control means is adapted to modify a parameter by causing the averaging to be performed over a second time period different from the first time period.

8. A secondary station as claimed in claim 7, wherein the control means is adapted to modify a parameter of the control information transmitted to the primary station by generating an indication of a power step size for transmission to the primary station to use when adjusting its transmit power.

9. A secondary station as claimed in claim 7, wherein the control means is adapted to receive an indication of the failure of the primary station to adjust its transmit power in compliance with one or more transmitted power control commands.

10. A secondary station as claimed in claim 7, wherein the control means is adapted to store an indication of one or more time periods at which the primary station may fail to adjust its transmit power in compliance with a transmitted power control command and wherein the control means is responsive to the occurrence of the one or more time periods for modifying a parameter of the control information transmitted to the primary station.

11. A secondary station as claimed in claim 7, wherein the control means is adapted to detect failure of the primary station to adjust its transmit power in compliance with one or more transmitted power control commands.

12. A secondary station as claimed in claim 11, wherein the control means is adapted to detect failure of the primary station to adjust its transmit power in compliance with one or more transmitted power control commands by determining the signal-to-interference ratio (SIR) of a received signal and by detecting when a function of the SIR fulfills a criterion.

13. A method of operating a communication system comprising a primary station and a secondary station, the method comprising the steps of:
   transmitting at least one signal from the primary station;
   receiving, at the secondary station, the at least one transmitted signal, and measuring at least one characteristic of the received signal, deriving one or more power control commands and/or one or more channel quality reports from at least one measured characteristic, and transmitting control information including at least one power control command and/or at least one channel quality report at a predetermined rate;
   receiving, at the primary station, the at least one power control command and/or at least one channel quality report, adjusting the transmit power of a signal in compliance with a received power control command provided that the adjustment is within the contemporaneous capability of the primary station, and/or determining at least one parameter of a signal in response to a channel quality report;
   modifying, at the secondary station, in response to the primary station failing to adjusting the transmit power in compliance with a received power control command, at least one parameter of the transmitted control information; and
   adapting, at the primary station, in response to receiving modified control information, a characteristic of a transmission;
   wherein modifying a parameter of control information transmitted to the primary station includes transmitting at least one channel quality report at a rate different from the predetermined rate.

14. A method as claimed in claim 13, wherein modifying a parameter of the control information includes transmitting an indication of a power step size for use by the primary station when adjusting its transmit power.

15. A method as claimed in claim 13, wherein times at which the primary station fails to adjust the transmit power in compliance with one or more received power control commands are predetermined.

16. A method as claimed in claim 13, further comprising the step of:
   detecting, at the primary station, a failure of the primary station to adjust the transmit power in compliance with one or more received power control commands and, in response to detecting such failure, transmitting to the secondary station an indication of the failure.

17. A method as claimed in claim 13, further comprising the step of:
   detecting, at the secondary station, a failure of the primary station to adjust the transmit power in compliance with one or more received power control commands.

18. A method as claimed in claim 17, wherein detecting a failure includes determining a signal-to-interference ratio (SIR) of a received signal and detecting when a function of the SIR fulfills a criterion.

19. A method of operating a communication system comprising a primary station and a secondary station, the method comprising:
   transmitting at least one signal from the primary station;
   receiving, at the secondary station, the at least one transmitted signal, and measuring at least one characteristic of the received signal, deriving one or more power control commands and/or one or more channel quality reports from a measured characteristic, whereby at least one channel quality report is derived by averaging a function of a measured characteristic of a first time period, and transmitting one or more channel quality reports and/or control information including at least one power control command;
   receiving, at the primary station, at least one channel quality report and/or at least one power control command, determining at least one parameter of a signal in response to a channel quality report and/or adjusting the transmit power of a signal in compliance with a received power control command provided that the adjustment is within the contemporaneous capability of the primary station;
   modifying, at the secondary station, in response to the primary station failing to adjusting the transmit power in compliance with a received power control command, at least one parameter of the transmitted control information; and
   adapting, at the primary station, in response to receiving modified control information, a characteristic of a transmission;
   wherein modifying a parameter of the control information includes averaging a function of a measured characteristic over a second time period different from the first time period.

20. A method as claimed in claim 19, wherein modifying the parameter of the control information transmitted to the primary station includes transmitting an indication of a power step size for use by the primary station when adjusting its transmit power.

21. A method as claimed in claim 19, wherein times at which the primary station fails to adjust the transmit power in compliance with one or more received power control commands are predetermined.

22. A method as claimed in claim 19, further comprising the step of:
   Detecting, at the primary station, a failure of the primary station to adjust the transmit power in compliance with one or more received power control commands and, in response to detecting such failure, transmitting to the secondary station an indication of the failure.

23. A method as claimed in claim 19, further comprising the step of:
   detecting, at the secondary station, a failure of the primary station to adjust the transmit power in compliance with one or more received power control commands.

24. A method as claimed in claim 23, wherein detecting a failure includes determining a signal-to-interference ratio (SIR) of a received signal and detecting when a function of the SIR fulfills a criterion.

* * * * *